United States Patent [19]

Ohi

[11] Patent Number: 5,043,642
[45] Date of Patent: Aug. 27, 1991

[54] APPARATUS FOR CONTROLLING BLOWER MOTOR OF AUTOMOBILE AIR-CONDITIONER

[75] Inventor: Shinichi Ohi, Konan, Japan

[73] Assignee: Diesel Kiki Co., Ltd., Tokyo, Japan

[21] Appl. No.: 504,139

[22] Filed: Apr. 3, 1990

[30] Foreign Application Priority Data

Apr. 6, 1989 [JP] Japan .................................. 1-87374
Apr. 25, 1989 [JP] Japan .............................. 1-48463[U]

[51] Int. Cl.⁵ ............................................. H02P 6/02
[52] U.S. Cl. ..................................... 318/254; 318/138
[58] Field of Search ............... 318/138, 254, 439, 481; 165/16, 43, 42, 41

[56] References Cited

U.S. PATENT DOCUMENTS

| | | | |
|---|---|---|---|
| 3,999,108 | 12/1976 | Tanikoshi | 318/138 |
| 4,250,435 | 2/1981 | Alley et al. | 318/254 X |
| 4,317,072 | 2/1982 | Goof et al. | 218/138 |
| 4,456,055 | 6/1984 | Yoshimi et al. | 165/43 X |
| 4,458,583 | 7/1984 | Fukui et al. | 165/16 X |
| 4,546,293 | 10/1985 | Peterson et al. | 318/138 X |
| 4,763,052 | 8/1988 | Lundin et al. | 318/254 |
| 4,806,833 | 2/1989 | Young | 318/481 X |
| 4,858,676 | 8/1989 | Bolfik et al. | 165/43 X |
| 4,914,924 | 4/1990 | Takahashi | 165/43 X |

Primary Examiner—Bentsu Ro
Attorney, Agent, or Firm—Wenderoth, Lind & Ponack

[57] ABSTRACT

An apparatus for controlling a brushless type blower motor of an automobile air conditioner includes a rotational speed setting unit for setting a rotational speed of the brushless motor, a drive unit for driving the brushless motor according to the speed of rotation set by the rotational speed setting unit, and a switching control unit for controlling the excitation timing of the brushless motor achieved by the drive unit. The driving unit includes a waveform storage unit for changing the waveform of a voltage to be impressed to the brushless motor. The waveform storage unit outputs a sine waveforms, a trapezoidal waveform or a square waveform according to the rotational speed set by the rotational speed setting unit.

1 Claim, 7 Drawing Sheets

APPARATUS FOR CONTROLLING BLOWER MOTOR OF AUTOMOBILE AIR-CONDITIONER

BACKGROUND OF THE INVENTION

1. Field of the Invention

The present invention relates to apparatus for controlling a blower motor composed of a brushless motor.

2. Description of the Prior Art

Blowers of automobile air-conditioners generally comprise a sirocco fan driven by a motor. When the operation of the automobile air-conditioners is changed from the vent mode in which the flow resistance within an air-flow duct is relatively small, to the defrost mode in which the flow resistance in the air-flow duct is relatively large, the performance characteristics of the conventional blowers are such that the flow rate of the sirocco fan decreases while at the same time the motor rotational speed increases. At the time of this mode change, if a control is achieved to maintain the speed of rotation of the motor at a constant level, the flow rate of the sirocco fan will be considerably reduced in the defrost mode.

In recent years, a demand for a silent vehicle passenger compartment has greatly increased with the prolonged service life of motor vehicles. This demand involves a study of sound reduction of a blower motor which constitutes a noise generating source. The conventional blower motor is equipped with brushes and hence is structurally limited as to the reduction of the noise level.

With this difficulty in view, an attempt has been made to realize a blower motor composed of a brushless motor as the size and manufacturing cost of the brushless motor are progressively reduced. To control rotation of such a brushless motor, the speed of rotation of a rotor of the brushless motor is detected by a Hall-effect element rotor and a signal proportional to the detected rotor revolution speed is converted into a voltage signal which in turn is compared with a predetermined reference voltage so as to maintain the difference between two compared signals at a constant value. This rotation control system is disclosed in Japanese Patent Laid-open Publication No. 58-36184. Japanese Patent Laid-open Publication No. 58-54884 discloses another rotation control system in which the power voltage is regulated with a change in rotational speed of the brushless motor.

SUMMARY OF THE INVENTION

With the foregoing difficulties in view, it is an object of the present invention to provide an apparatus for controlling a blower motor of an automobile air-conditioner which is capable of preventing undue changes in the flow rate of the blower motor even when the flow resistance varies.

According to a first aspect of the present invention, there is provided an apparatus for controlling a blower motor of an automobile air-conditioner, including target rotational speed setting circuitry for setting a target speed of rotation for a blower motor composed of a brushless motor; a rotation sensor for detecting a current speed of rotation of the blower motor; rotational speed correcting circuitry for correcting an output signal from the target rotational speed setting circuitry according to the difference between a setting value from the target rotational speed setting circuitry and a detected value from the rotation sensor; and driving circuitry for driving the blower motor according to an output signal from the rotational speed correcting circuitry.

In a stable condition in which the flow resistance does not change, the blower motor is driven by the drive circuitry according to the setting value from the target rotational speed setting circuitry. When the detected value from the rotation sensor varies with changes in flow resistance, the output signal from the target rotational speed setting circuitry is corrected by the rotational speed correcting a circuitry so as to cancel out or taken up changes in flow rate.

According to a second aspect of the present invention, there is provided an apparatus for controlling a blower motor of an automobile air-conditioner, the blower motor being composed of a brushless motor, the apparatus including rotational speed setting circuitry for setting a speed of rotation for the brushless motor; drive circuitry for driving the brushless motor while controlling excitation of the brushless motor in such a manner that the speed of rotation of the brushless motor is in equal to a value set by the rotational speed setting circuitry; and switching control means operatively connected to the drive circuitry for controlling excitation timing of the brushless motor achieved by the drive circuitry.

With this construction, the blower motor composed of the brushless motor is driven by the driven circuitry according to a rotational speed set by the rotational speed setting circuitry. Since there is no feedback loop provided for maintaining a constant rotational speed, a change in flow resistance, if occurs, causes the rotational speed to vary correspondingly.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
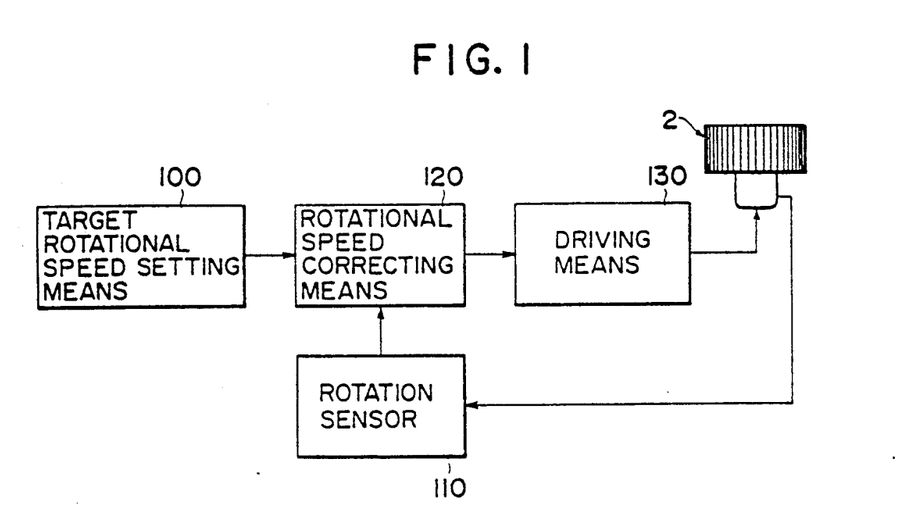
FIG. 1 is an operational block diagram of an apparatus for controlling a blower motor of an automobile air-conditioner according to a first embodiment of the present invention.

The general construction of an apparatus for controlling a blower motor of an automobile air-conditioner embodying the present invention will be described below with reference to FIG. 1.

The apparatus generally includes target rotational speed setting unit 100 for setting a target speed of rotation for a brushless motor 41, a rotation sensor 110 for detecting current speed of rotation of the brushless motor 41, a rotational speed correcting unit 120 for correcting an output signal from the target rotational speed setting unit 100 according to the difference between a setting value from the target rotational speed setting unit 100 and a detected value from the rotation sensor 110, and driving unit 130 for driving the brushless motor 41 according to an output signal from the rotational speed correcting unit 120.

Figure 2:
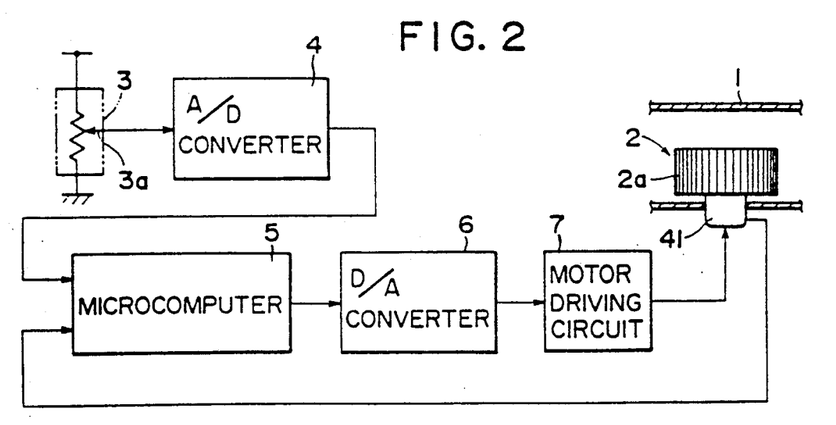
FIG. 2 is a pictorial block diagram showing the general construction of the blower motor controlling apparatus.

Structural details of the apparatus will be described below with reference to FIG. 2.

The automobile air-conditioner includes an air-flow duct 1 and a blower 2 disposed in the air-flow duct 1 adjacent to the upstream end thereof. The blower 2 has a sirocco fan 2a mounted on a blower motor composed of a brushless motor 41.

The brushless motor 41 is of the construction known per se including a rotor formed of a permanent magnet, armature coils for producing a rotating magnetic field, and a Hall-effect element. A typical example of such brushless motor 41 is disclosed in Japanese Utility Model Application No. 63-97171. Structural components of the brushless motor do not constitute an essential part of the present invention and hence a further description is not necessary.

The apparatus includes a rotational speed setter 3 for setting the speed of rotation of the brushless motor 41. The rotational speed setter 3 is composed of a variable resistor having a slidably movable terminal 3a from which an output voltage is delivered to an analog-to-digital (A/D) converter 4. The A/D converter 4 converts the thus received voltage signal into a digital signal which in turn is inputted into a microcomputer 5.

The microcomputer 5 is of the construction known per se including a central processing unit (CPU), a read only memory (ROM), a random access memory (RAM), an input/output port, etc.

The microcomputer 5 receives an output signal from the Hall-effect element (not shown) disposed inside the brushless motor 41.

Based on input signals received from the A/D converter 4 and the non-illustrated Hall-effect element, the micro-computer 5 computes a control signal required for the control of rotation of the brushless motor 41 according to a program stored in the ROM and outputs the thus computed control signal. The control signal thus outputted is then delivered to a digital-to-analog (D/A) converter 6 connected to the output side of the microcomputer 5. The D/A converter 6 supplies the control signal as an analog signal to a motor driving circuit 7 which in turn is operative to control the operation of the brushless motor 41.

The microcomputer 5 shown in the illustrated embodiment is constructed so as to control the operation of non-illustrated components of the automobile air-conditioner, but, it may be provided exclusively for the control of the blower motor.

Figure 3A:
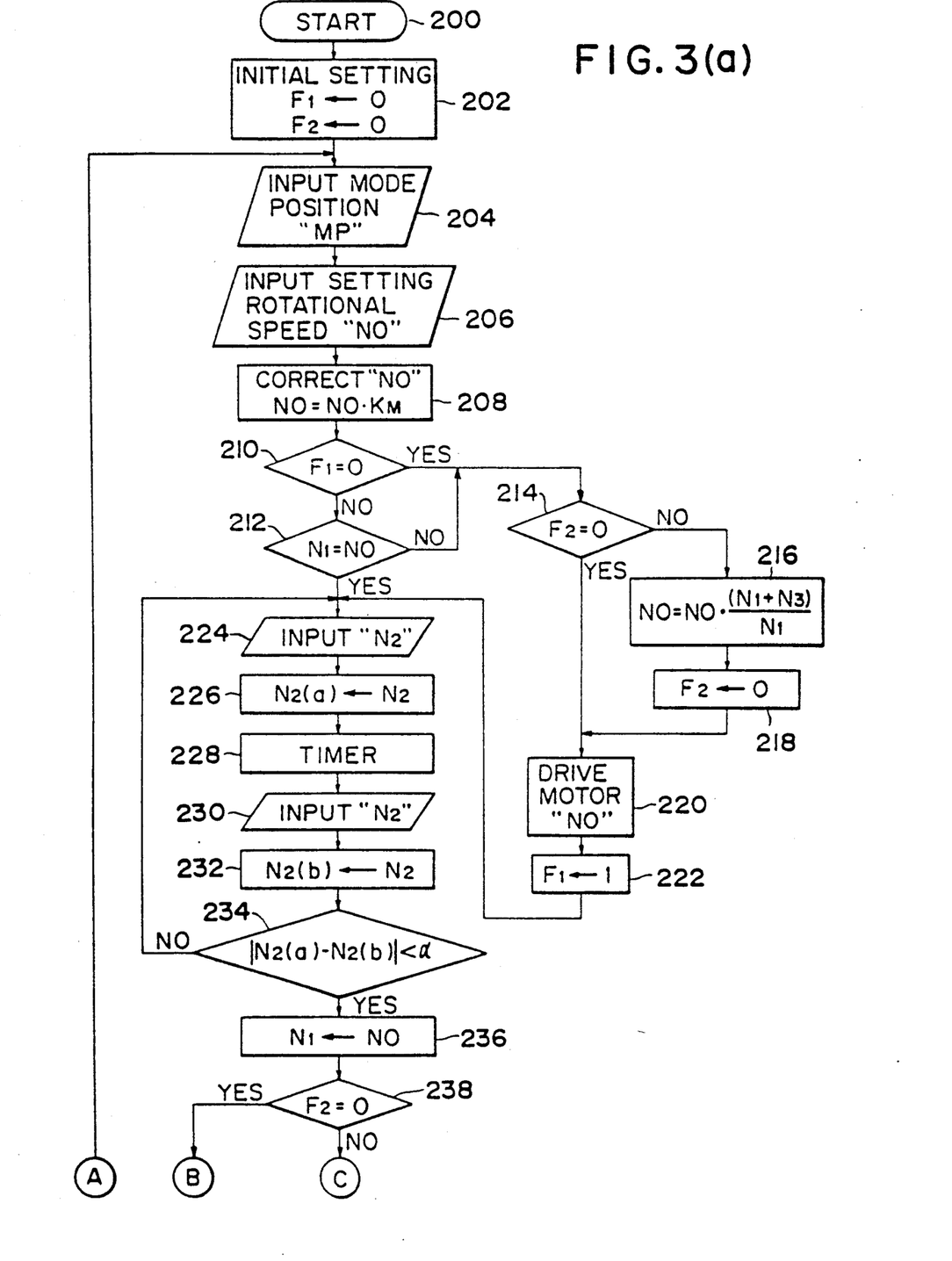
FIGS. 3(a) and 3(b) are flowcharts showing a control routine achieved by a microcomputer incorporated in the apparatus for controlling the operation of the blower motor.
Figure 3B:
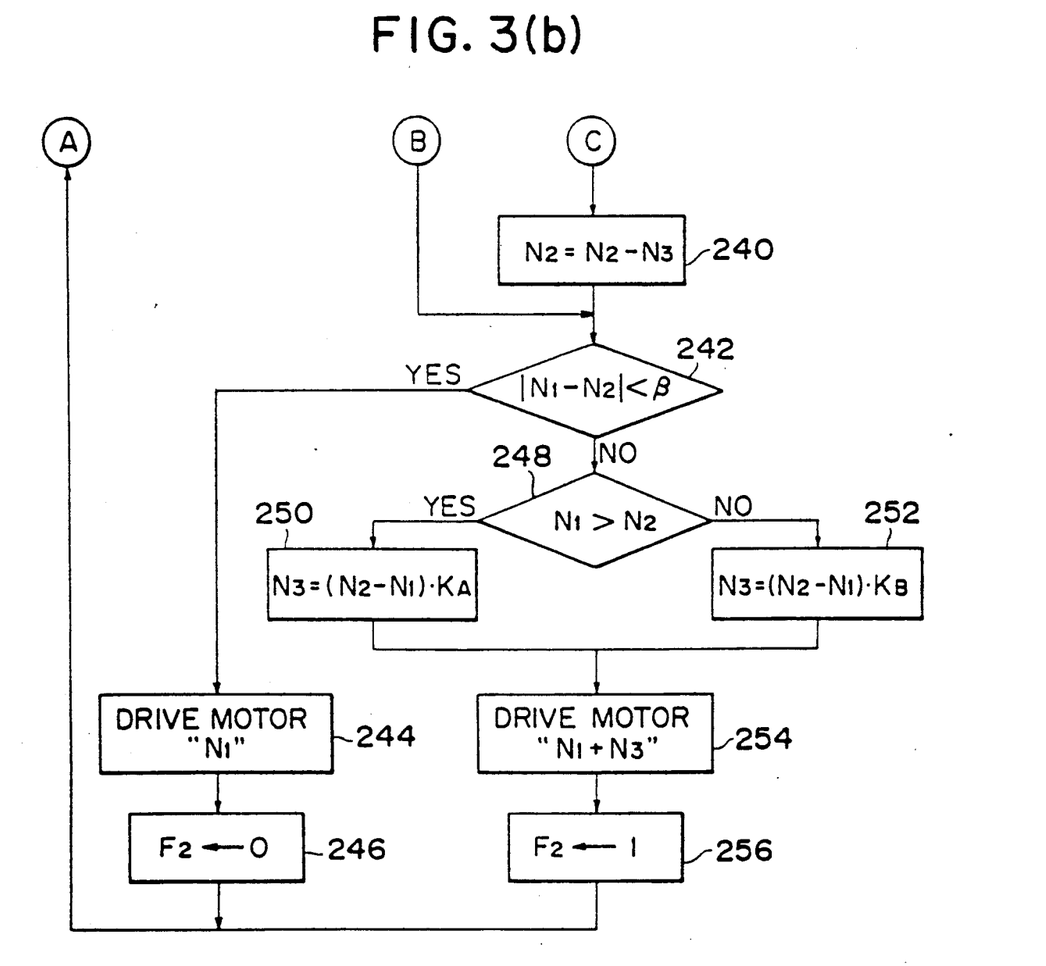

The control of the operation of the brushless motor 41 achieved by the microcomputer 5 will be described with reference to a control flowchart shown in FIGS. 3(a) and 3(b).

The microcomputer 5 starts its control routine in a step 200. Then the control proceeds to a step 202 to initialize variables. Typical examples of such variables to be initialized include a flag $F_1$ and a flag $F_2$. After the flags $F_1$, $F_2$ are set to zero, the control goes on to a step 204.

The flag $F_1$ is used to judge whether the current execution of the control program is a first time which immediately follows the start of the apparatus, or a second or succeeding time. If the judgment indicates the second or succeeding time, then the flag $F_1$ is set to "1". The flag $F_2$ is used to make a judgment as to whether or not the correction of rotation of the brushless motor 41 is achieved. If yes, the flag $F_2$ is set to "1".

At step 204, information is input about the current discharge mode position of a non-illustrated mode door of the air-conditioner which is selectively set in a vent mode position, a defrost mode position and a foot mode position. The mode position information are inputted in terms of a variant MP of predetermined values.

In the case where the microcomputer 5 is used for the control of the entire operation of the air-conditioner, the information about the mode position are inputted from a main program stored in the microcomputer 5.

The control proceeds to a step 206 in which the rotational speed setter 3 inputs a setting rotational speed $N\phi$. Then, the control advances to a step 208.

At step 208, the setting rotational speed $N\phi$ is corrected by multiplying the same by an arithmetic constant $K_M$. The constant $K_M$ is determined depending on the discharge mode and is set, for example, to have a maximum value in the defrost mode, a minimum value in the foot mode, and an intermediate value in the vent mode.

The step 208 is followed by a step 210 in which a judgment is made to determine whether or not the flag $F_1$ is zero. If zero (YES), this means that the current operation of the control program takes place at a first time immediately after the start of the apparatus. Then, the control advances to a step 214. Alternatively, if $F_1$ is not zero (NO), the control goes on to a step 212.

At step 214, a judgment is made as to whether the flag $F_2$ is zero. If zero (YES), this means that the correction of rotation in a step 220 or a step 254 described later is not effected. Then the control goes on to a step 220 in which a control signal corresponding to the rotational speed $N\phi$ which is calculated in the above-mentioned step 208 is applied to the motor driving circuit 7, thereby driving the brushless motor 41. The step 220 is followed by a step 222 in which the flag $F_1$ is set to "1" and the control goes on to a step 224.

In the, case where the judgment in the step 214 indicates that $F_2$ is other than zero (NO), this means that the rotational speed is corrected by a step 254 described later. Then the control advances to a step 216 in which $N\phi$ is renewed by multiplying the $N\phi$ which is obtained in the above-mentioned step 208, by $(N_1+N_3)/N_1$ where $N_1$ is a target rotational speed which is set in the step 212. The target rotational speed is a rotational speed which is set at the input side of the motor driving circuit 7 under such conditions that the flow resistance is kept constant and the brushless motor 41 is rotating stably. In practice, a voltage signal corresponding to such a target rotational speed is supplied from the D/A converter 6 to the motor driving circuit 7. When the flow rate changes with a change in flow resistance, the rotational speed of the brushless motor 41 is corrected (in the step described later) to restore the initial flow rate. The thus corrected rotational speed is designated by $N_3$ and referred to as a corrected rotational speed.

Figure 4A:
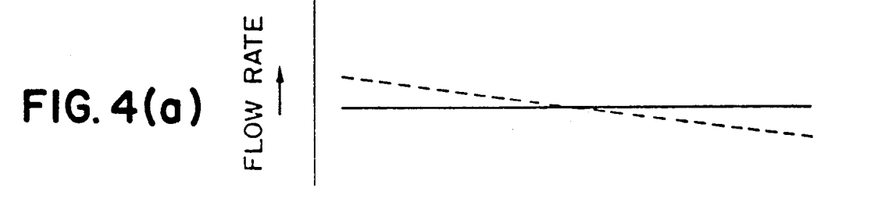
FIG. 4(a) is a graphic representation of a performance curve showing the relationship between the flow resistance and the flow rate of the blower motor.
Figure 4B:
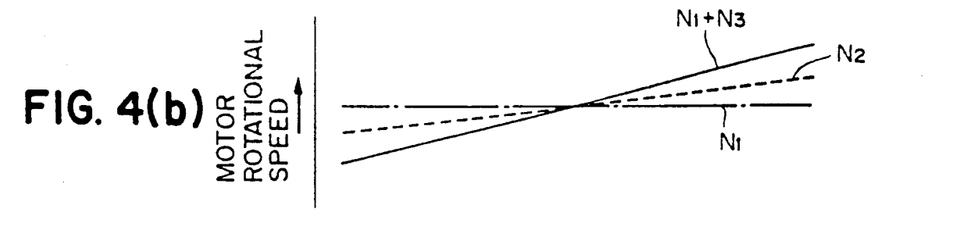
FIG. 4(b) is a graphic representation of a performance curve showing the relationship between the flow resistance and the motor rotational speed.
Figure 4C:
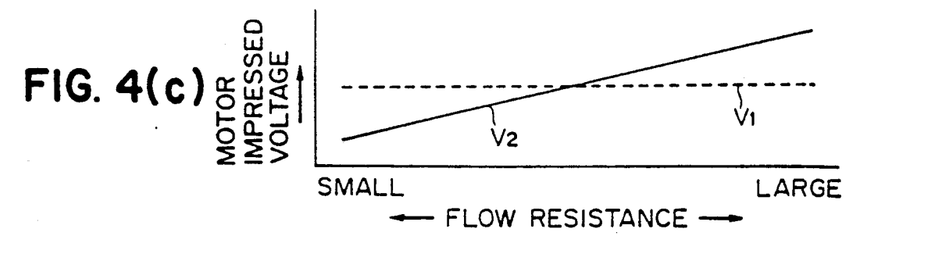
FIG. 4(c) is a graphic representation of a performance curve showing the relationship between the flow resistance and the motor impressed voltage.

FIG. 4 indicates the relationship between the flow rate, motor rotational speed and motor impressed voltage with respect to changes of the flow resistance in the air-flow duct 1 occurring when the discharge mode is changed. In FIG. 4(b), a dash-and-dot line corresponds to the above-mentioned $N_1$, a solid line corresponds to $N_1 + N_3$ stated above, and a broken line corresponds to a rotational speed $N_2$ which is detected when the flow rate is changed due to changes in flow resistance.

As described above, the setting rotational speed $N\phi$ is renewed or changed in the step 216. This is because the setting rotational speed must be changed at the same ratio as the amount of correction of the actual rotational speed effected by $N_3$ in the step 254 in order to maintain the effect of correction by $N_3$ even at a time of subsequent change of the setting rotational speed by the rotational speed setter 3.

After the arithmetic operation in the step 216 is completed, the control advances to the step 218 so as to set $F_2$ to zero. Then the control goes on to the step 220 in which a voltage corresponding to $N\phi$ is applied to the input terminal of the motor driving circuit 7 so as to drive the brushless motor 41 at a value $N\phi$ calculated in the step 216. This step 220 is followed by the step 222 described above.

At step 212 a judgment is made to determine whether the target rotational speed $N_1$ is in equal to the setting rotational speed $N\phi$. If $N_1 = N\phi$ (YES), then the control proceeds to the step 224. Alternately, if $N_1 \neq N\phi$ (NO), the control returns to the step 214.

At step 224, the current actual motor rotational speed $N_2$ is inputted based on the detected signal from the Hall-effect element. Then the control advances to step 226 in which the motor rotational speed inputted in the step 224 is set to a variable $N_{2(a)}$. The control further advances to a step 228 in which a timer is started to provide a predetermined period of time before the start of the next following operation. When the predetermined time period elapses, the control goes on to a step 230.

At step 230, the actual motor rotational speed $N_2$ is detected again and, thereafter, the control advances to a step 232 in which the detected value is set to a variable $N_{2(b)}$. The control advances to a step 234.

At step 234, a judgment is made to determine whether an absolute value of the difference between a value of $N_{2(a)}$ and a value of $N_{2(b)}$ is smaller than a predetermined value $\alpha$. If the absolute value is smaller than $\alpha$ (YES), this means that the rotation of the motor is in the stable state. Then the control returns to the step 224 stated above. If the absolute value is equal to or greater than $\alpha$ (NO), this means that the rotation of the motor is in the unstable state. In this case, the control advances to a step 236.

At step 236, the setting rotational speed $N\phi$ is set to $N_1$ and, thereafter, the control goes on to a step 238 in which a judgment is made to determine whether or not $F_2$ is zero. If the judgment indicates $F_2 = O$ (YES), the control jumps over a step 240 to a step 242. Conversely, if $F_2 \neq 0$ (NO), the control advances to the step 240 in which the difference between $N_2$ and $N_3$ is set to $N_2$. Thereafter, the control advances to the step 242.

At step 242, a judgment is made to determine whether or not an absolute value of the difference between $N_1$ and $N_2$ is smaller than a predetermined value or not. If the absolute value is smaller than (YES), this means that a change in motor rotational speed is relatively small and correction of rotational speed is unnecessary. Then the control goes on to a step 244 in which the target rotational speed $N_1$ is maintained to control operation of the brushless motor at this speed. The step 244 is followed by a step 246 so to set $F_2$ to zero and, thereafter, the control returns to the step 204 from which the foregoing operations are repeated.

If the judgment in the step 242 indicates that the absolute value is equal to or smaller than $\beta$ (NO), then the control advances to a step 248 in which a judgment is made to determine whether or not $N_1$ is greater than $N_2$ or not. If $N_1 > N_2$ (YES), the control goes on to a step 250 in which $N_3$ is substituted by a value obtained by multiplying the difference between $N_1$ and $N_2$ by a predetermined arithmetic constant $K_A$. If $N_1 > N_2$ (NO), then the control goes on to a step 252 in which $N_3$ is substituted by a value obtained by multiplying the difference between $N_1$ and $N_2$ by a predetermined arithmetic constant $K_B$. At step 252 or the step 250 is followed by the step 254 in which $N_3$, calculated in the step 250 or the step 252, is added to and a resulting value is outputted to the motor driving circuit 7, thereby driving the brushless motor. This step is practically achieved by changing the voltage impressed to the brushless motor 41 from a target voltage $V_1$ (indicated by the broken line in FIG. 4(c)) corresponding to the uncorrected target rotational speed $N_1$, to a voltage $V_2$ (indicated by the solid line in the same Figure) corresponding to the sum of $N_1$ and $N_2$.

The step 254 is followed by a step 256 in which $F_2$ is set to "1" and then the control returns to the step 204.

The operation of the apparatus of the foregoing construction is as follows. A non-illustrated start switch is actuated to start the operation of the apparatus. In this instance, if the discharge mode is the vent mode, the rotational speed setter 3 sets a relatively low rotational speed. The input terminal of the motor driving circuit 7 is supplied with a voltage which is corresponding to the setting rotational speed $N\phi$. Thus, the brushless motor 41 is excited. Immediately after the start of the brushless motor 41, the motor rotational speed increases gradually toward $N\phi$ and hence setting of $N\phi$ to $N_1$ is retarded until after rotation of the brushless motor becomes stable to a certain extent. Thereafter, when the difference between $N_1$ and $N_2$ falls within an allowable range, the microcomputer 5 output $N_1$ to the motor driving circuit 7, thereby driving the brushless motor (see steps 224 through 238 and steps 242 through 246 described above).

While the brushless motor 41 is operating stably at the target rotational speed $N_1$, the discharge mode is changed from the vent mode to the defrost mode. This mode change causes a reduction of the flow rate and an increase in flow resistance which will increase the rotational speed of the brushless motor 41. In this instance, a correction of the rotational speed is performed to further increase the rotational speed of the brushless motor 41 so as to accommodate the reduction of the flow rate (see step 254 described above). After Nφ is corrected to such an extent equivalent to N₃ (see step 254 described above), the brushless motor 41 is driven by the thus corrected Nφ so that the rotational speed of the brushless motor 41 is stabilized. When the difference between the actual motor rotational speed N₂ and Nφ falls within the allowable range, then a value of Nφ set to N₁ is supplied, as a new target rotational speed, from the microcomputer 5 to the motor driving circuit 7 in the same manner as done at the start of the apparatus.

Figure 5:
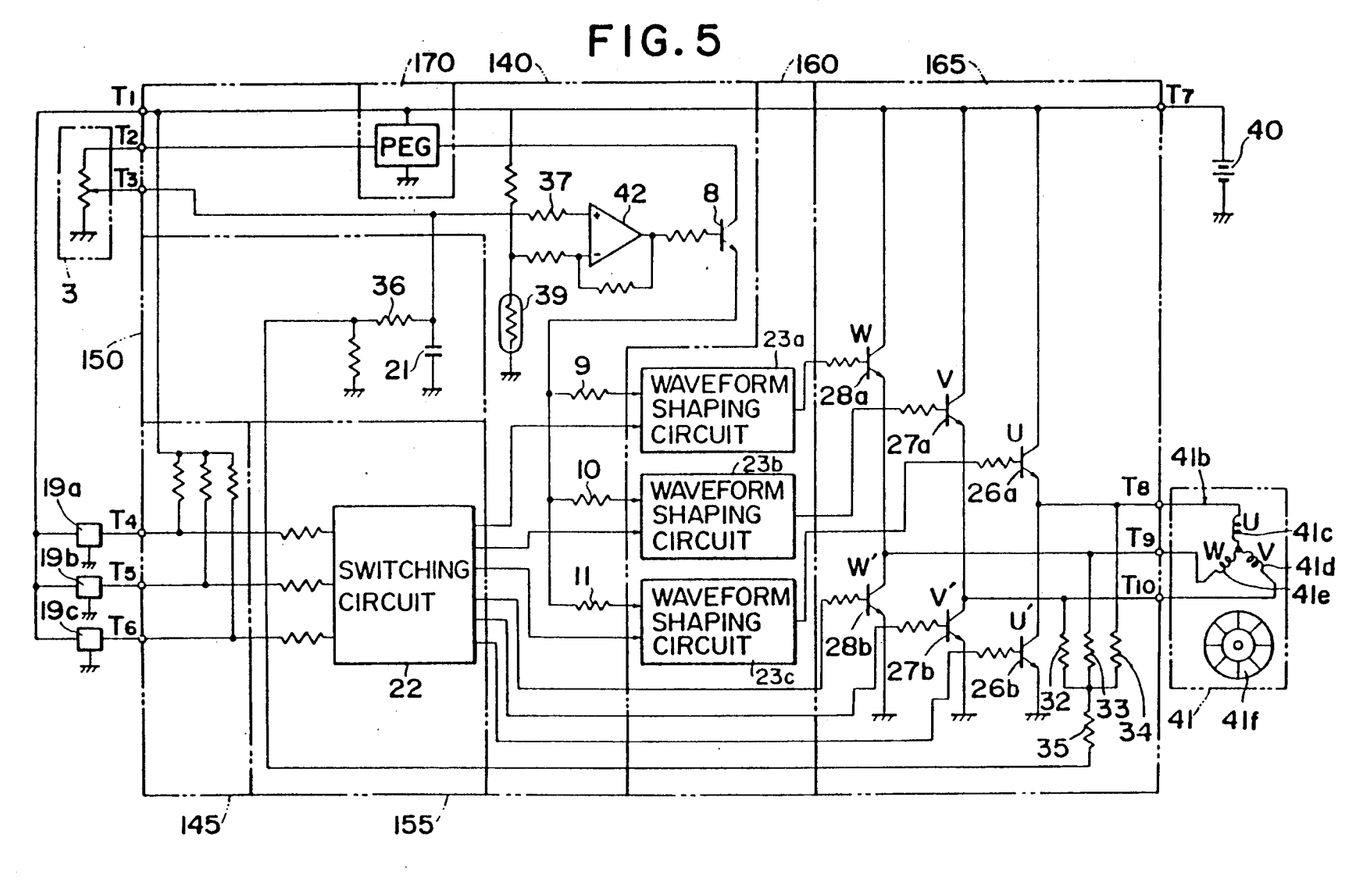
FIG. 5 is a circuit diagram of an apparatus for controlling a blower motor of an automobile air-conditioner according to a second embodiment of the invention.

An apparatus for controlling a blower motor of an automobile air-conditioner according to a second embodiment of the present invention will be described below with reference to FIG. 5.

The blower motor control apparatus includes a rotational speed setting circuit 140, a rotational speed detection circuit 145, an arithmetical mean circuit 150, a switching control circuit 155, a drive input control circuit 160, a driver circuit 165 and a voltage-regulating transformer circuit 170. A rotational speed setter 3 composed of a variable resistor is connected between external terminals $T_2$ and $T_3$. Likewise, Hall-effect elements 19a, 19b, 19c constituting a part of the rotation detection circuit 145 are connected between an external terminal $T_1$ and external terminals $T_4$—$T_1$ A direct-current (dc) power supply 40 is connected to an external terminal $T_7$ and a brushless motor 41 is connected to external terminals $T_8$—$T_{10}$. The rotational speed setting circuit 140 is constructed to set a rotational speed for the brushless motor 41 and includes a differential amplifier circuit composed mainly by an operational amplifier 42, and a distributing circuit composed mainly by a transistor 8.

To a non-inverted input terminal of the operational amplifier 42, a voltage which corresponds to the setting rotational speed set by the externally connected rotational speed setter 3 and an output voltage from the arithmetic mean circuit 150 described later are applied. The inverted input terminal of the operational amplifier receives a reference voltage. The difference between the input voltage applied to the non-inverted input terminal and the reference voltage applied to the inverted input terminal is amplified and the thus amplified voltage is applied to the base terminal of the transistor 8. An output voltage delivered from the emitter terminal of the transistor 8 is inputted through resistors 9–11 to the drive input control circuit 160.

A temperature sensor 39 composed of a thermistor having a negative temperature coefficient of resistance, for example, is connected to the inverted input terminal of the operational amplifier 42 of the rotational speed setting circuit 140. The temperature sensor 39 functions to adjust the output level of the arithmetic mean circuit 150 according to the vehicle passenger compartment temperature and the motor temperature. In other words, the temperature sensor 39 is disposed in the vehicle passenger compartment or in the brushless motor 41. Since resistance of the temperature sensor 39 decreases with an increase in temperature detected by the temperature sensor 39, the input level of the arithmetic mean circuit 150 relative to the operational amplifier 42 is lowered. Conversely, the resistance of the temperature sensor 39 increases with a reduction in temperature detected by the temperature sensor 39 so that the input level to the operational amplifier 42 is increased by the temperature sensor 39. Thus, the temperature sensor 39 serves to compensate for fluctuations of motor output power caused by changes in temperature. This temperature compensation is employed in view of the tendency that the motor output power is large at low temperatures and is low at high temperatures. However, since the brushless motor 41 is kept in the air-cooled condition by the sirocco fan, a appreciable temperature rise never occurs and hence the fluctuation of the output power is negligible.

The rotation detection circuit 145 is constructed to detect the rotation of a rotor 41f of the brushless motor 41 and is composed mainly of the three Hall-effect elements 19a-19c disposed adjacent to the rotor 41f via the external terminals $T_4$-$T_6$.

The Hall-effect elements 19a-19c comprise a magnetic sensor capable of producing an output signal the magnitude of which is variable proportional to the direction and strength of an external magnetic field acting on the Hall-effect elements 19a-19c.

Figure 7A:
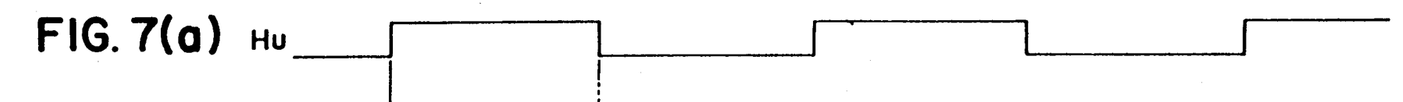
FIGS. 7(a)-7(i) are timing charts showing detected signals of Hall-effect elements and operation timings of respective transistors in a driver circuit of the apparatus shown in FIG. 5.
Figure 7B:
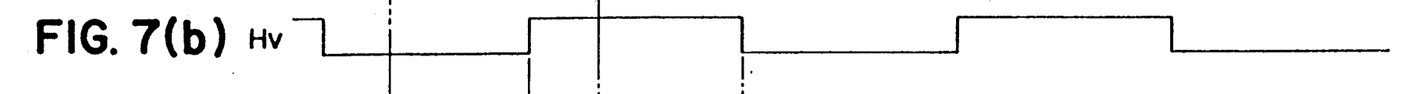
Figure 7C:
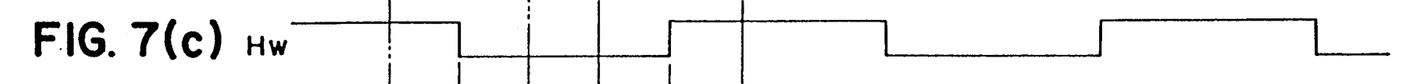
Figure 7D:
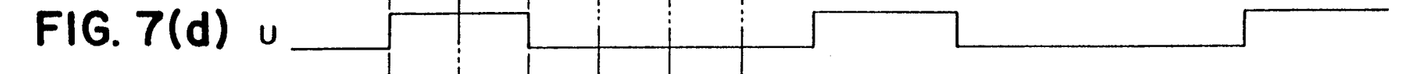
Figure 7E:
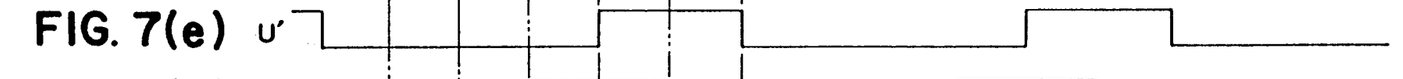
Figure 7F:
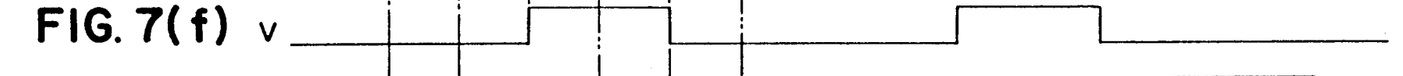
Figure 7G:
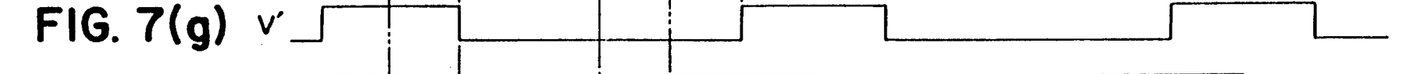
Figure 7H:
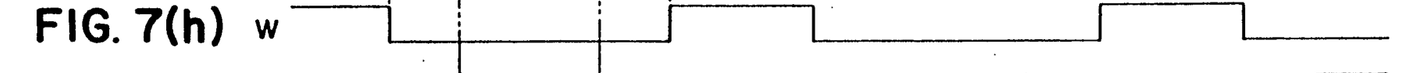
Figure 7I:
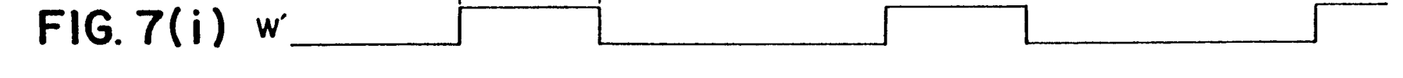

The three Hall-effect elements 19a-19c are provided in view of the stator windings 41b which are composed of three-phase windings so that they are disposed adjacent to the rotor 41f at equal angular intervals of 120 degrees. The first to third Hall-effect elements 19a-19c output signals $H_U$, $H_V$, $H_W$ respectively at timings shown in FIGS. 7(a)-7(c) as the rotor 41f revolves.

The arithmetic mean circuit 120 is constructed to feed back to the operational amplifier 42 an arithmetic mean value of the respective phase voltages of the stator windings as a feedback signal.

More particularly, the arithmetic mean circuit 120 is constructed to pickup the phase voltages of the respective phase windings 41c-41e via resistors 32-34. The phase voltages are added or combined at a resistor 35 which in turn an added voltage is applied via a resistor 36 to a capacitor 21. Thus, the voltage appearing across the capacitor 21 is obtained by the following expression $$V = K \cdot (V_U + V_V + V_W)/3$$

where $V_U$, $V_V$ and $V_W$ are voltages applied to the respective phase windings 41c-41e, and K is a constant.

On end of the capacitor 21 opposite to the ground side is connected via a resistor 37 to the non-inverted input terminal of the operational amplifier 42.

The switching control circuit 155 is construct to determine the driving timing of transistors 26a, 26b, 27a, 27b, 28a, 28b that form the driver circuit 165 described later. The switching control circuit 155 is composed mainly by a switching circuit 22 having a logic circuit which is constructed so as to output switching signals shown in FIGS. 7(d)-7(i) based on the output signal from the rotation detecting circuit 145. In FIGS. 7(d)-7(i), reference characters U, V, W, U', V' and W' correspond to the transistors 26a, 26b, 27a, 27b, 28a and 28b shown in FIG. 5 and respective signal illustrate on-off timing of the corresponding transistors 26a, 26b, 27a, 27b, 28a and 28b.

The drive input control circuit 160 is constructed to receive the output signal from the rotational speed setting circuit 140 and the output signals from the switching control circuit 155 and output a drive signal to the driver circuit 165 under the control of the timing of the output signals received from the switching control circuit 155, the driving signal corresponding to the setting rotational speed.

The drive input control circuit 160 is composed mainly of three identical waveform shaping circuits 23a–23c.

Figure 6:
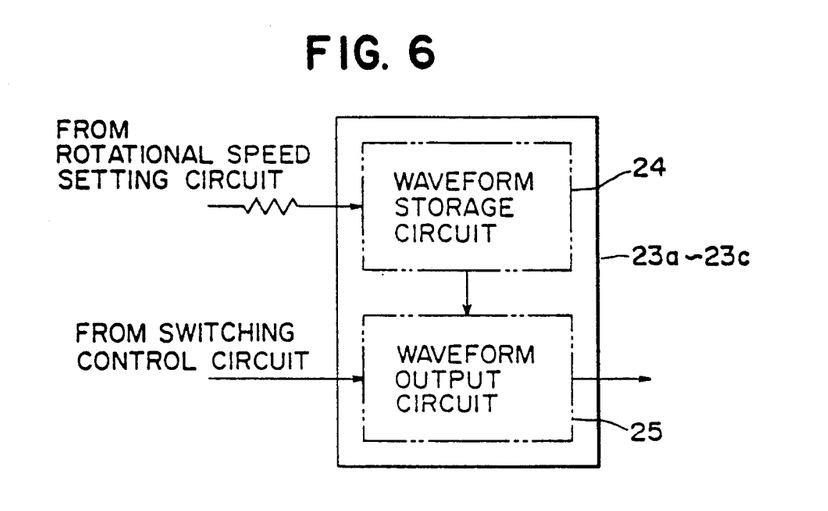
FIG. 6 is a block diagram of a waveform shaping circuit of the apparatus shown in FIG. 5.

As shown in FIG. 6, each of the waveform shaping circuits 23a–23c is composed of a waveform storage circuit 24 and a waveform output circuit 25.

Figure 8A:
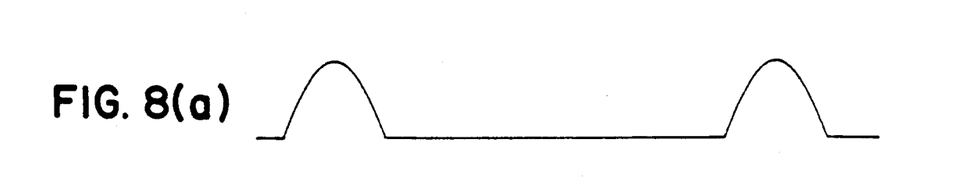
FIGS. 8(a)-8(c) are views showing waveforms of output signals issued from the waveform shaping circuit shown in FIG. 6.
Figure 8B:
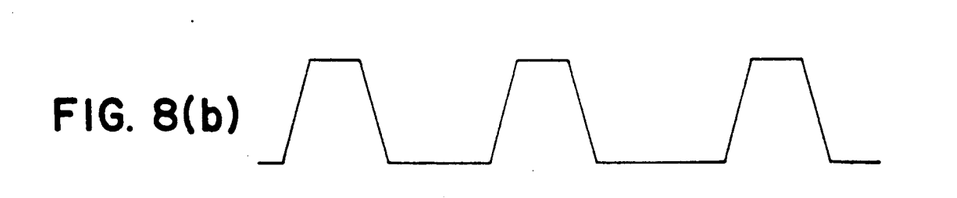
Figure 8C:
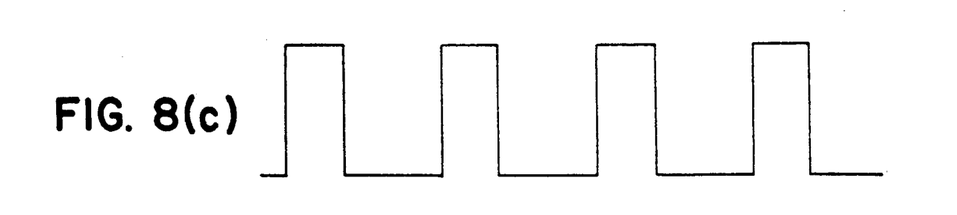

The waveform storage circuit 24 serves to vary the output waveform of the drive input control circuit 160 according to the motor rotational speed. It is constructed to store three different waveforms such as shown in FIG. 8. When the setting rotational speed for the brushless motor 41 is a low speed (i.e., when the output voltage from the rotational speed setting circuit 140 is low), the waveform storage circuit 24 outputs a signal having a sine waveform shown in FIG. 8(a). In the case where the setting rotational speed for the brushless motor 41 is an intermediate speed (i.e., when the output voltage from the rotational speed setting circuit 140 is intermediate), the waveform storage circuit 24 outputs a signal having a trapezoidal waveform shown in FIG. 8(b). And, when the setting rotational speed for the brushless motor 41 is a high speed (i.e., when the output voltage from the rotational speed setting circuit 140 is high), a signal having a square waveform shown in FIG. 8(c) is outputted from the waveform storage circuit 24.

On the other hand, the waveform output circuit 25 is constructed to receive the output signals from the waveform storage circuit 24, and then amplify the same at a predetermined amplification degree substantially direct proportional to the magnitude of output voltage of the rotational speed setting circuit 140 and output the amplified output signal to the driver circuit 165 in accordance with the timing of the output signals from the switching control circuit 155.

The driver circuit 165 is constructed to control excitation of the respective phase windings 41c–41e of the stator windings 41b of the brushless motor 41. It is composed mainly of the transistors 26a, 26b, 27a, 27b, 28a, 28b.

Each of the transistors 26a, 26b, 27a, 27b, 28a, 28b is turned on and off depending on the output timing of a corresponding one of the output signals issued from the switching control circuit 155 and the drive input control circuit 160. The transistors 26a, 26b, 27a, 27b, 28a, 28b also serve to supply an exciting current through the terminals $T_8$–$T_{10}$ to the stator windings 41b according to the output voltage received from the drive input control circuit 160. The on-off operation of the respective transistors 26a, 26b, 27a, 27b, 28a, 28b is controlled in the manner as shown in FIGS. 7(d)–7(i). With this controlled excitation of the respective phase windings, a rotating magnetic field is produced in the brushless motor 6 rotating in the direction from the U-phase to the V-phase and then to the W-phase.

The voltage-regulating transformer circuit 170 is connected to the externally connected dc power supply 40 to regulate the output voltage so as to output a stable dc voltage. The voltage-regulating transformer circuit 170 comprises an transformer element composed of an integrated circuit IC package know per se and has a function to reduce a dc 12V to a dc 5V.

The brushless motor 41 connected via the external terminal $T_8$–$T_{10}$ to the apparatus is of the type known per se including the stator windings 41b having the U-phase, V-phase and W-phase windings 41e—41e, and the rotor 41f composed of a permanent magnet, and hence a further description is not necessary.

The blower motor control apparatus of the foregoing construction will operate as follows. The rotational speed setter 1 is set to a relatively low speed of rotation before the operation of the apparatus begins. When a non-illustrated power switch is turned on to energize the dc power supply 40, the voltage applied to the non-inverted input terminal is amplified at a predetermined amplification degree and the thus amplified voltage is output from the output terminal of the operational amplifier 42. In proportion to the output voltage, an exciting current flows through the stator windings 41b whereupon the rotor 41f is rotated. In this instance, the exciting current has a sign waveform such as shown in FIG. 8(a) due to the operation of the drive input control circuit 160. The starting operation of the brushless motor 41 begins smoothly without an unpleasant beat noise which may be generated from the stator windings 41b due to a rush current applied thereto at the start of the brush motor when a square waveform signal is used. As the rotational speed of the rotor 41f approaches the setting rotational speed, the output voltage from the arithmetic mean circuit 150 gradually increases. As a result, the non-inverted input terminal of the operational amplifier 42 is supplied with a combination of the voltage corresponding to the setting rotational speed set by the rotational speed setter 3 and the output voltage from the arithmetic mean circuit 150. In this instance, if the voltage applied to the stator windings 41b is stable, that is the power voltage is stable, the output voltage from the arithmetic mean circuit 150 has a predetermined value. Thus, an amplified signal which corresponds to the difference between the sum of this predetermined value and the output voltage of the rotational speed setter 3, and the reference voltage applied to the inverted input terminal appears at the output terminal of the operational amplifier 42 and the circuitry retains this stable condition.

When the impressed voltage on the stator windings 41b drops for some reason, the output voltage from the capacitor 21 is lowered, thereby lowering the impressed voltage on the non-inverted input terminal of the operational amplifier 42. Consequently, the input signal of the driver circuit 165 becomes small whereupon the exciting current flowing through the stator windings 41b is reduced, thereby reducing the voltage drop in the respective phase windings 41c–41e. This cancels out or compensates the previous voltage drop so that the impressed voltage is kept substantially constant at all the times. In other words, the voltage applied to the stator windings 41b is kept at a constant level and hence a control of the brushless motor 41 under the condition of a constant flux control can be performed.

Obviously, various modifications and variations of the present invention are possible in the light of the above teachings. It is therefore to be understood that within the scope of the appended claims the present invention may be practiced otherwise than as specifically described.

What is claimed is:

1. An apparatus for controlling a blower motor in an automobile air-conditioner, the blower motor being composed of a brushless motor, said apparatus comprising:
    (a) rotational speed setting means for setting a speed of rotation for the brushless motor;
    (b) drive means for driving the brushless motor while controlling excitation of the brushless motor in such a manner that the speed of rotation of the brushless motor is in equal to a value set by said rotational speed setting means; and (c) switching control means operatively connected to said drive means for controlling excitation timing of the brushless motor achieved by said drive means;

wherein said driving means includes a waveform storage means for changing the waveform of a voltage to be impressed to the brushless motor according to an output signal from said rotational speed setting means, said waveform storage means outputting an impressed voltage having a sine waveform when the rotational speed set by said rotational speed setting means is a low rotational speed, outputting an impressed voltage having a substantially trapezoidal waveform when the rotational speed set by said rotational speed setting means is an intermediate rotational speed, and outputting an impressed voltage having a square waveform when the rotational speed set by said rotational speed setting means is a high rotational speed.

* * * * *